Patented Jan. 8, 1952

2,581,419

UNITED STATES PATENT OFFICE 2,581,419

PROCESS FOR PRODUCING RIBOFLAVIN

David A. Legg and Samuel C. Beesch, Philadelphia, Pa., assignors to Publicker Industries, Inc., Philadelphia, Pa.

No Drawing. Application October 9, 1945, Serial No. 621,384

5 Claims. (Cl. 195—42)

The present invention relates to the production of riboflavin by bacterial action and it relates more particularly to a new and improved process for producing high yields of riboflavin during bacterial fermentation.

An object of the present invention is to provide a new and improved process for producing riboflavin by bacterial action. Another object of the present invention is to provide a process for producing high yields of riboflavin during the bacterial fermentation of carbohydrates. Still another object of the present invention is to provide a process for producing high yields of riboflavin during the butanol-acetone fermentation of starch-containing materials.

Other objects and advantages of the present invention are apparent in the following detailed description and the appended claims.

It has been known, for the past ten years or more, that riboflavin is produced during bacterial fermentation of carbohydrates to give organic solvents, primarily butanol and acetone. This production of riboflavin has been found to occur during the butanol-acetone fermentation of both sugar mashes (such as molasses) and starch mashes (such as cereals).

The cereal heretofore employed almost universally in the butanol-acetone fermentation has been corn which has been considered the best source of starch, both from the standpoint of cost and from the standpoint of solvent yield.

Corn mashes have, however, given relatively low and inconsistent yields of riboflavin during the fermentation.

Various suggestions have been made in the past for modification of the butanol-acetone fermentation of corn mashes so as to produce better yields of riboflavin. Thus, it has been commonly known that the presence of iron in corn mash lowers the yield of riboflavin and, accordingly, it has been common practice for some time to remove the iron from the corn prior to its fermentation.

It has also been found that the addition to the corn mash of such materials as degerminated corn and brown rice improves the riboflavin yield produced during the butanol-acetone fermentation.

In our Patent 2,370,177, we claim the addition to a cereal mash (such as corn and rice mash) of a substance capable of liberating sulphite radical for the purpose of increasing the riboflavin yield obtained during the butanol-acetone fermentation.

We have now found that, quite unexpectedly, the butanol-acetone fermentation of a mash containing wheat flour (either alone or mixed with corn or other starchy materials) results in consistently higher yields of riboflavin than are obtainable during the similar fermentation of corn or other cereal mashes in the absence of wheat flour.

We have found that this consistently high yield of riboflavin results when a mash containing wheat flour is fermented with any organism capable of producing substantial yields of butanol and acetone. These organisms will be designated in this specification and in the appended claims as *Clostridium acetobutylicum*; this term being used in a generic sense to designate all organisms capable of producing substantial yields of butanol and acetone from a cereal mash.

We prefer to use the material known in the trade as granular wheat flour, which consists of wheat from which substantially all of the bran and a large part of the germ has been removed and which is ground so that most of it remains on a 100 mesh sieve. A typical analysis of a granular wheat flour shows starch 67.96%, moisture 12.90%, and protein (N×6.25) 12.78%.

Generally speaking, the process of the present invention may be practiced by weighing out, in glass or aluminum or other non-ferrous vessels, the cereal to be used (wheat flour either alone or mixed with corn or other cereal) which has been substantially freed from iron by a magnetic separator, adding substantially iron-free water to the cereal and mashing at 212° F. for one half hour, thereafter sterilizing the mash at 15 lbs. steam-pressure for approximately two hours, cooling and inoculating the sterilized mash with an active culture of *Clostridium acetobutylicum* and allowing the inoculated mash to ferment at 37° C. for about 72 hours. After the fermentation is complete, a sample of the filtered or whole mash is assayed by the fluorometric method. Alternatively the sample may be evaporated to dryness in vacuo and assayed by the microbiological method. As is well known in the art, certain strains of *Clostridium acetobutylicum* give better results on a particular medium than do other strains. We have found, however, that any strain of *Clostridium acetobutylicum* will give a better yield of riboflavin when the mash contains wheat flour than is the case when wheat flour is omitted and some other cereal is employed.

Ordinarily, granular wheat flour (either alone or mixed with other cereals) provides sufficient nutrients adequately to promote the growth of *Clostridium acetobutylicum*. However, should the mash be deficient in any necessary nutrient materials these can be added to the mash either before or during the fermentation, in a manner well known in art.

Similarly, it is possible to control the conditions of the fermentation (including temperature, pH, time, etc.) so as best to suit the particular strain of organism employed.

The following are illustrative but not restrictive examples of the way in which the process of the present invention can be carried out; the yields, when expressed as "mcgs. of riboflavin/gram" (of dry filtered stillage) representing an assay of the solids obtained by evaporating to dryness "stillage" (that is, the fermented mash from which the volatile solvents, including the butanol and acetone, have been distilled off) after filtering through a coarse filter.

EXAMPLE 1

Aqueous mashes, each containing a total of 7% of cereal, were fermented with *Clostridium acetobutylicum* (strain A) with the results contained in Table 1 below:

*Table 1*

| Composition of Cereal | Riboflavin mcgs./gram |
|---|---|
| granular wheat flour | 405 |
| granular wheat flour (25%) plus corn meal (75%) | 1,050 |
| granular wheat flour (50%) plus corn meal (50%) | 1,885 |
| granular wheat flour (75%) plus corn meal (25%) | 1,340 |
| corn meal | 62 |

EXAMPLE 2

Aqueous mashes, each containing a total of 7% of cereal, were fermented with *Clostridium acetobutylicum* (strain A) with the results shown in Table 2 below:

*Table 2*

| Composition of Cereal | Solvents, grams/liter | Riboflavin, mcgs./gram |
|---|---|---|
| granular wheat flour | 17.87 | 1,109 |
| whole corn meal | 16.75 | 73 |
| granular wheat flour (50%) plus whole corn meal (50%) | 17.81 | 1,065 |
| granular wheat flour (25%) plus whole corn meal (75%) | 17.24 | 540 |
| granular wheat flour (75%) plus whole corn meal (25%) | 18.12 | 977 |
| granular wheat flour | 16.38 | 1,056 |
| whole wheat meal | 16.16 | 70 |
| granular wheat flour (50%) plus whole wheat meal (50%) | 16.26 | 300 |
| granular wheat flour (25%) plus whole wheat meal (75%) | 16.09 | 116 |
| granular wheat flour (75%) plus whole wheat meal (25%) | 16.66 | 974 |

EXAMPLE 3

Aqueous mashes containing varying percentages of granular wheat flour were fermented with *Clostridium acetobutylicum* (strain B) with the results shown in Table 3 below; it being found that a concentration of 4–6% and preferably 5% is the best for production of a high riboflavin residue:

*Table 3*

| Percent of Granular Wheat Flour | Total Solvents | | Riboflavin, mcgs./gram |
|---|---|---|---|
| | grams/liter | yield, percent of flour | |
| *Per cent* | | | |
| 1 | 1.02 | 10.0 | 1,334 |
| 2 | 3.76 | 18.8 | 1,876 |
| 3 | 6.76 | 22.8 | 1,824 |
| 4 | 8.62 | 21.5 | 1,812 |
| 5 | 11.37 | 22.7 | 2,143 |
| 6 | 13.48 | 22.4 | 1,872 |
| 7 | 15.54 | 22.2 | 1,809 |
| 8 | 17.66 | 22.0 | 1,583 |
| 9 | 19.54 | 21.7 | 1,252 |
| 10 | 21.04 | 21.0 | 1,415 |

EXAMPLE 4

Various aqueous mashes, each containing 4% of granular wheat flour, were fermented with *Clostridium acetobutylicum* (strain B) with the results shown in Table 4 below; these results indicate that reasonably consistent high yields of riboflavin can be obtained using granular wheat flour of the proper concentration:

*Table 4*

| Mash No. | Riboflavin | |
|---|---|---|
| | mcgs./100 ml. | mcgs./gram |
| | *Gamma* | |
| 1 | 2,400 | 3,000 |
| 2 | 2,660 | 3,325 |
| 3 | 2,650 | 3,312 |
| 4 | 2,400 | 3,000 |
| 5 | 2,400 | 3,000 |
| 6 | 2,160 | 2,700 |
| 7 | 2,200 | 2,750 |
| 8 | 2,160 | 2,700 |
| 9 | 2,520 | 3,150 |
| 10 | 2,160 | 2,700 |
| 11 | 2,260 | 2,825 |
| 12 | 2,600 | 3,225 |
| Average | 2,380 | 2,974 |

EXAMPLE 5

Aqueous mashes, each containing a total of 4% of cereal, were fermented with *Clostridium acetobutylicum* with the results shown in Table 5 below; these results indicating that the yield of riboflavin obtainable even from such reputedly favorable raw materials as degerminated corn and brown rice, is increased when granular wheat flour is included in the mash:

*Table 5*

| Composition of Cereal | Strain of Cl. acetobutylicum | Fermentation No. | Riboflavin, mcgs./gram |
|---|---|---|---|
| Brown Rice | Strain B | 1 | 1,215 |
| Do | do | 2 | 1,250 |
| Do | do | 3 | 1,360 |
| Brown Rice (50%) plus granular wheat flour (50%) | do | 1 | 3,430 |
| Do | do | 2 | 3,430 |
| Do | do | 3 | 3,115 |
| Degerminated Corn | Strain C | 1 | 3,600 |
| Do | do | 2 | 3,430 |
| Do | do | 3 | 3,135 |
| Degerminated Corn (50%) plus granular wheat flour (50%) | do | 1 | 4,180 |
| Do | do | 2 | 4,000 |
| Do | do | 3 | 3,635 |

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described our invention, we claim as new and desire to protect by Letters Patent:

1. A process for producing substances having relatively high riboflavin content which comprises preparing an aqueous mash containing approximately 4–6% of granular wheat flour and fermenting the mash with *Clostridium acetobutylicum*.

2. A process for producing substances having relatively high riboflavin content which comprises preparing an aqueous mash content approximately 2% of granular wheat flour and approximately 2% of at least one other cereal and fermenting the mash with *Clostridium acetobutylicum*.

3. A process for producing substances having relatively high riboflavin content which comprises preparing an aqueous mash containing approximately 4–6% of cereal, said cereal including a substantial proportion of granular wheat flour, and fermenting said mash with *Clostridium acetobutylicum*.

4. A process for producing substances having relatively high riboflavin content which comprises preparing an aqueous mash containing approximately 2% of granular wheat flour and approximately 2% of brown rice and fermenting the mash with *Clostridium acetobutylicum*.

5. A process for producing substances having relatively high riboflavin content which comprises preparing an aqueous mash containing approximately 2% of granular wheat flour and approximately 2% of degerminated corn and fermenting the mash with *Clostridium acetobutylicum*.

DAVID A. LEGG.
SAMUEL C. BEESCH.

REFERENCES CITED

The following references are of record in the file of this patent:

UNITED STATES PATENTS

| Number | Name | Date |
| --- | --- | --- |
| 2,297,671 | Yamasaki | Sept. 29, 1942 |
| 2,368,074 | Walton | Jan. 23, 1945 |
| 2,386,374 | Weizmann | Oct. 9, 1945 |

OTHER REFERENCES

Consolidated Grain Milling Catalogue, No. 6, published by American Miller and Processor (1945), Chicago, Ill., pages 386, 387.